United States Patent
Passmore

(10) Patent No.: US 11,460,820 B2
(45) Date of Patent: Oct. 4, 2022

(54) MOBILE CAN-BUS CONTROL SYSTEM

(71) Applicant: Flo-Draulic Controls Ltd., Georgetown (CA)

(72) Inventor: Chris Passmore, Georgetown (CA)

(73) Assignee: FLO-DRAULIC CONTROLS LTD., Georgetown (CA)

( * ) Notice: Subject to any disclaimer, the term of this patent is extended or adjusted under 35 U.S.C. 154(b) by 345 days.

(21) Appl. No.: 16/742,799

(22) Filed: Jan. 14, 2020

(65) Prior Publication Data
US 2020/0225625 A1  Jul. 16, 2020

Related U.S. Application Data

(63) Continuation of application No. 62/792,269, filed on Jan. 14, 2019.

(51) Int. Cl.
| | |
|---|---|
| *G05B 19/042* | (2006.01) |
| *H04L 12/66* | (2006.01) |
| *H04L 12/40* | (2006.01) |
| *G06F 13/42* | (2006.01) |
| *H04L 9/06* | (2006.01) |
| *G06F 11/10* | (2006.01) |

(52) U.S. Cl.
CPC ........ *G05B 19/042* (2013.01); *G06F 11/1004* (2013.01); *G06F 13/4282* (2013.01); *H04L 9/0631* (2013.01); *H04L 12/40* (2013.01); *H04L 12/66* (2013.01); *G05B 2219/25032* (2013.01); *H04L 2012/40215* (2013.01)

(58) Field of Classification Search
CPC ............ G06F 11/1004; G06F 13/4282; G05B 19/042; H04L 9/0631; H04L 12/40; H04L 12/56
See application file for complete search history.

(56) References Cited

U.S. PATENT DOCUMENTS

| | | | |
|---|---|---|---|
| 9,008,651 B2* | 4/2015 | Kun-Szabo | ....... H04M 1/72445 455/414.1 |
| 10,475,257 B2* | 11/2019 | Sainaney | ............. G07C 5/0841 |
| 2008/0034248 A1* | 2/2008 | Danzer | ................. H04L 1/0057 714/1 |
| 2015/0198948 A1* | 7/2015 | Godley | .................. G07C 5/008 701/2 |

(Continued)

*Primary Examiner* — Henry Tsai
*Assistant Examiner* — Christopher A Daley
(74) *Attorney, Agent, or Firm* — Kinney & Lange, P.A.

(57) ABSTRACT

A mobile CAN-Bus control system is provided, in which a CAN-Bus based machinery converts CAN control signals to a data stream based on a communication schema. At least a portion of the converted data stream includes an index lookup identifier, which, together with a locally stored index loop table, permits the receiving device to extract the control signal. The data stream, which is compatible with communication protocols such as Bluetooth™ and/or Wi-Fi, is transmitted to a mobile controller, which in turn parses the data stream and translates it into useable data points based on a locally stored index lookup table. The mobile controller may upload the received data stream to a server for data storage and retrieval, and is capable of remotely accessing the CAN-Bus based system to modify system parameter values and bumping them to the CAN-Bus system to achieved desired operational state of the machinery.

12 Claims, 11 Drawing Sheets

(56) References Cited

U.S. PATENT DOCUMENTS

| | | | |
|---|---|---|---|
| 2016/0006623 A1* | 1/2016 | Liu | H04L 41/12 |
| | | | 370/254 |
| 2017/0054595 A1* | 2/2017 | Zhang | H04L 41/5051 |
| 2017/0308817 A1* | 10/2017 | Miller | H04W 4/80 |
| 2018/0174139 A1* | 6/2018 | Arora | G06Q 20/40 |
| 2021/0203682 A1* | 7/2021 | Bajpai | H04L 63/1408 |
| 2021/0240858 A1* | 8/2021 | Tsafack Chetsa | G06Q 50/18 |

* cited by examiner

| Protocol | CAN | | | |
|---|---|---|---|---|
| Description | CAN telegram mapping for Bluetooth App for reading and updating parameters. This CAN Message telegram outlines the messages being broadcasted from the App to the MC. Note: Unused bytes will not be sent | | | |
| Data Length (Bytes) | 4 to 8 | | | |
| CAN ID | 0x300 | | | |

142

| Description | Range | Length | Resolution | Units |
|---|---|---|---|---|
| Parameter Read/Write | 00-11 bin | 2 bit | 3 states/2 bit | bit |
| Parameter Single/All | 00-11 bin | 2 bit | 2 states/2 bit | bit |
| Parameter Sign | 00-11 bin | 2 bit | 2 states/2 bit | bit |
| Parameter Type | 00-11 bin | 2 bit | 4 states/2 bit | bit |
| Parameter Index | U16 | 2 bytes | | |
| Parameter Data | Variable | 1-4 bytes | | |

144 (DAT0–DAT7, bits B0–B7)

---

140b

| Protocol | CAN | | | |
|---|---|---|---|---|
| Description | CAN telegram mapping for MC for reading and updating parameters. This CAN Message telegram outlines the messages being broadcasted from the MC to the App. Note: Unused bytes will not be sent | | | |
| Data Length (Bytes) | 4 to 8 | | | |
| CAN ID | 0x350 | | | |

142

| Description | Range | Length | Resolution | Units |
|---|---|---|---|---|
| Parameter Read/Write | 00-11 bin | 2 bit | 3 states/2 bit | bit |
| Parameter Single/All | 00-11 bin | 2 bit | 2 states/2 bit | bit |
| Parameter Sign | 00-11 bin | 2 bit | 2 states/2 bit | bit |
| Parameter Type | 00-11 bin | 2 bit | 4 states/2 bit | bit |
| Parameter Index | U16 | 2 bytes | | |
| Parameter Data | Variable | 1-4 bytes | | |

| CHN | IDENTIFIER | FLG | DLC | D0 | 1... | 2... | 3... | 4... | 5... | 6... | D7 | TIME | DIR |
|---|---|---|---|---|---|---|---|---|---|---|---|---|---|
| 0 | 00000000 | | | ERROR FRAME | | | | | | | | 651.844940 | R |
| 0 | 00000100 | X | 8 | 00 | 00 | 08 | 00 | 00 | 00 | 00 | 05 | 652.246610 | R |
| 0 | 00000101 | X | 8 | 99 | 2A | 40 | 00 | 00 | 00 | 00 | 00 | 652.246010 | R |
| 0 | 00000102 | X | 8 | 7F | 05 | 7F | 05 | 0C | 00 | 00 | 00 | 651.335850 | R |
| 0 | 00000103 | X | 8 | 00 | 00 | 00 | 00 | 00 | 00 | 00 | 00 | 651.336440 | R |
| 0 | 00000104 | X | 8 | 00 | 00 | 01 | 00 | AD | 13 | 02 | 00 | 651.337040 | R |
| 0 | 0000030C | | 1 | 01 | | | | | | | | 652.062370 | R |
| 0 | 0000030D | | 2 | AC | 02 | | | | | | | 651.870370 | R |
| 0 | 00000358 | | 2 | FF | 01 | | | | | | | 651.758590 | R |
| 0 | 00000360 | | 2 | FF | 01 | | | | | | | 651.758840 | R |
| 0 | 00000740 | | 2 | OS | 00 | | | | | | | 651.335250 | R |
| 0 | 0C3A091E | X | 8 | F8 | 9F | 00 | 00 | 0C | 3A | 0A | 1E | 652.198220 | R |
| 0 | 0C3A0A1E | X | 8 | 00 | 00 | 00 | 00 | 00 | 00 | 00 | 00 | 652.197710 | R |
| 0 | 0C3A1D0A | X | 8 | F8 | 9D | 00 | 00 | 0C | 3A | 31E | 0A | 652.182520 | R |
| 0 | 0C3A1E0A | X | 8 | 00 | 00 | 00 | 00 | 00 | 00 | 00 | 00 | 652.182010 | R |
| 0 | 0VF00400 | X | 8 | 00 | 00 | 00 | 00 | 00 | 00 | 00 | 00 | 649.349030 | R |
| 0 | 10F71010 | X | 8 | 01 | 00 | 00 | 00 | 00 | 00 | 00 | 00 | 652.183720 | R |
| 0 | 10F71110 | X | 8 | 7F | 7F | 05 | 05 | 7F | 7F | 7F | 7F | 652.183120 | R |
| 0 | 10FD0810 | X | 8 | 8 | 00 | 7F | 00 | 05 | 00 | 05 | 00 | 651.838710 | R |
| 0 | 10FF2310 | X | 8 | 00 | 00 | 40 | 40 | 00 | 00 | 00 | 00 | 651.846140 | R |
| 0 | 10FF2410 | X | 8 | 04 | 00 | 00 | 00 | 00 | 00 | 00 | 00 | 651.846710 | R |
| 0 | 10FFDC10 | X | 8 | 7F | 00 | 7F | 00 | 7F | 00 | 7F | 7F | 651.839310 | R |
| 0 | 10FFDD10 | X | 8 | 00 | 00 | FD | FE | 88 | 13 | 88 | 13 | 651.840850 | R |
| 0 | 10FFDE10 | X | 8 | 88 | 13 | 88 | 13 | 88 | 13 | 00 | 00 | 651.841450 | R |
| 0 | 10FFDF10 | X | 8 | 00 | 00 | 00 | 00 | 03 | 00 | 02 | 00 | 651.841960 | R |
| 0 | 10FFE010 | X | 8 | FF | FF | AD | 13 | 00 | 00 | 00 | 00 | 651.842550 | R |
| 0 | 10FFE110 | X | 8 | 00 | 00 | 00 | 00 | 00 | 00 | 00 | 00 | 651.843150 | R |
| 0 | 10FFE210 | X | 8 | 00 | 00 | 00 | 00 | 00 | 00 | 00 | 00 | 651.843750 | R |
| 0 | 10FFE310 | X | 8 | 00 | 00 | 00 | 00 | 00 | 00 | 00 | 00 | 651.844350 | R |
| 0 | 10FFE410 | X | 8 | 00 | 00 | 00 | 00 | 00 | 00 | 00 | 00 | 651.845540 | R |
| 0 | 18FECA10 | X | 8 | 01 | 01 | 01 | 01 | 01 | 01 | 01 | 01 | 638.367820 | R |

FIG. 5

| CHN | IDENTIFIER | FLG | DLC | D0 | 1... | 2... | 3... | 4... | 5... | 6... | D5 | TIME | DIR |
|---|---|---|---|---|---|---|---|---|---|---|---|---|---|
| 0 | 0000030C | | 1 | 01 | 02 | | | | | | | 369.784400 | R |
| 0 | 0000030D | | 1 | AC | | | | | | | | 406.053460 | R |
| 0 | 10F71010 | X | 8 | 01 | 00 | 00 | 00 | 00 | 00 | 00 | 00 | 406.365960 | R |
| 0 | 10F71110 | X | 8 | 7F | 7F | 7F | 05 | 7F | 7F | 7F | 7F | 406.365350 | R |
| 0 | 10FD0810 | X | 8 | 7F | 00 | 00 | 7F | 05 | 00 | 05 | 00 | 406.261330 | R |
| 0 | 10FF2310 | X | 8 | 00 | 00 | 00 | 00 | 00 | 00 | 00 | 00 | 406.268150 | R |
| 0 | 10FF2410 | X | 8 | 04 | 00 | 7F | 7F | 7F | 00 | 00 | 00 | 406.268750 | R |
| 0 | 10FFDC10 | X | 8 | 7F | 00 | FD | FE | 88 | 13 | 7F | 13 | 406.261930 | R |
| 0 | 10FFDD10 | X | 8 | 00 | 13 | 88 | 13 | 88 | 13 | 88 | 00 | 406.262440 | R |
| 0 | 10FFDE10 | X | 8 | 88 | 00 | 00 | 00 | 04 | 00 | 02 | 00 | 406.263030 | R |
| 0 | 10FFDF10 | X | 8 | 00 | FF | AD | 13 | 00 | 00 | 00 | 13 | 406.263630 | R |
| 0 | 10FFE010 | X | 8 | FF | 00 | 00 | 00 | 00 | 00 | 00 | 00 | 406.264230 | R |
| 0 | 10FFE110 | X | 8 | 00 | 00 | 00 | 00 | 00 | 00 | 00 | 00 | 406.265770 | R |
| 0 | 10FFE210 | X | 8 | 00 | 00 | 00 | 00 | 00 | 00 | 00 | 00 | 406.266360 | R |
| 0 | 10FFE310 | X | 8 | 00 | 00 | 00 | 00 | 00 | 00 | 00 | 00 | 406.266960 | R |
| 0 | 10FFE410 | X | 8 | 00 | 00 | 00 | 00 | 00 | 00 | 00 | 00 | 406.267560 | R |

FIG. 6 ns in CAN-Bus may
MOBILE CAN-BUS CONTROL SYSTEM

CROSS-REFERENCE TO RELATED APPLICATIONS

This application claims the benefit of and priority to U.S. Provisional Patent Application No. 62/792,269 filed Jan. 14, 2019, the contents of which are incorporated herein by reference.

TECHNICAL FIELD

The present disclosure relates to a mobile control system for remotely monitoring and controlling one or more CAN-Bus based machinery via mobile controllers and a method of same.

BACKGROUND

Controller Area Network (CAN)-Bus is a serial-based communication protocol that typically runs on two wires at floating voltages. The system is robust towards failure of subsystems and electromagnetic noise/interference and permits multiple device communication, thus making it ideal for automotive and manufacturing applications. Today, the CAN-Bus technology is commonly adopted in the automotive sector, as well as heavy-duty machinery, manufacturing equipment, and the military.

However, inherent to its floating voltage design is CAN-Bus's incompatibility with standard communication protocols such as Bluetooth™, Ethernet, Wi-Fi, serial, and USB, all of which run on fixed voltage communication. This presents a barrier to integrating a CAN-Bus based system with other technological platforms commonly used today, which in turn often leads to monitoring and control of CAN-Bus based systems being labor intensive, inefficient, and costly. Moreover, operation of CAN-Bus based systems, such as heavy-duty vehicles or equipment, often rely on the expertise of individual operators, which may lead to inconsistent and inefficient operational results. Furthermore, the user interface with the CAN-Bus systems may be antiquated compared to current user-experience (UX) developments today. Data security of CAN-Bus based signal transmission may also be lacking and renders it vulnerable to hacking.

Additionally, existing communication schemas for converting CAN-Bus signals into wireless signals may be complex, which in turn may cause the overall system to be error prone and may require large communication bandwidth.

SUMMARY

To at least partially overcome some of the disadvantages of the prior art, the present disclosure provides a system that may enable remote bi-directional communication between a CAN-Bus based machinery with a mobile controller. The system may be operable to convert CAN-Bus communication signals into a data stream that is compatible with wireless communication protocols, such as Serial Port Protocol for Bluetooth™ or Wi-Fi, based on a communication schema that is comparatively simple to process, reliable, bandwidth efficient. The converted data stream includes an index lookup identifier, which may be extracted by the receiving device. The extracted index lookup identifier may be used to extract the transmitted parameter value using a locally stored index lookup table. The mobile controller may include a mobile communication unit or a portable computer device, and is capable of processing received data stream to extract system parameter values to determine one or more operational states of the machinery. Further, the mobile communication unit may modify the value of the parameter values and transmit them to the CAN-Bus based system and cause the machinery to perform one or more specific operations or to achieve a desired operational result. The foregoing effectively integrates the mobile communication device into a mobile control system.

Emphasis has also been placed on providing a control system that is, at least in some aspects, simple, reliable and bandwidth efficient. Simplicity of the communication within the control system makes it possible to processes communication messages without significant parsing. Further, the control system provided herein, in at least some aspects, utilizes a communication schema that may be reliable and bandwidth efficient, which may be well suited for wireless communication. The communication messages used in the control system provided herein may be formatted to be of minimal size yet still contain sufficient boilerplate data to ensure successful communication.

In one aspect, the communication schema provided herein replaces at least a portion of a communication message with an index lookup identifier. A corresponding locally stored index lookup table may permit the mobile controller, and machinery, and data storage device to retrieve the intended values based on the received index lookup identifier for further processing.

In another aspect, by converting CAN-Bus based signals to Bluetooth™ or Wi-Fi compatible data streams using the communication schema disclosed herein, existing data encryption techniques may be applied to improve data security.

In a further aspect, the mobile communication unit may be in bi-directional communication with a server to upload received system parameters of the machinery for storage. The stored data may be retrieved by the mobile communication device for display or analysis. The communication schema in accordance with the present disclosure may be designed to handle inherent latency in the server communication.

In a still further aspect, the system parameters of a machinery may be retrieved and analyzed in near real-time, such that modifications to the system parameter values may be made to remedy issues or to achieve a desired operational result in a timely fashion.

In a still further aspect, improved user interface may be provided to present system parameters and operational state to operators.

In a still further aspect, communications in CAN-Bus may be translated into signals that are compatible with iOS and Android OS's based on the communication schema in accordance with the present disclosure.

In a still further aspect, the present disclosure provides a mobile control system, comprising: a mobile controller; a machinery with a CAN control system, capable of converting CAN-Bus control signals incorporating data points into a data stream based on a communication schema; a gateway operably coupled to the CAN control system, the gateway is configured to transmit the converted control signals to the mobile controller; wherein the data stream includes an index lookup identifier, the index lookup identifier permits the mobile controller and the machinery to identify the data points based on a locally stored index lookup table.

In a still further aspect, the present disclosure provides a method of controlling a CAN-Bus based system, the method comprising: mapping a CAN-Bus based control system operating parameter value from a machinery into a data stream based a communication schema, the data stream includes an index lookup identifier; transmitting the data stream to a mobile controller through a communication gateway; parsing the received data stream; extracting the operating parameter value using the index lookup identifier based on a locally stored index lookup table.

BRIEF DESCRIPTION OF THE DRAWINGS

Reference will now be made, by way of example, to the accompanying drawings which show example embodiments of the present application, and in which:

FIG. 2 is an example digital command message in accordance with one embodiment of a communication schema provide in the present disclosure;

FIG. 3 is examples of analog command messages in accordance with one embodiment of a communication schema provide in the present disclosure;

FIG. 4 is examples of parameter read/write messages in accordance with one embodiment of a communication schema provide in the present disclosure;

FIG. 5 is an example serial data stream prior to entering a communication gateway in accordance with the present disclosure;

FIG. 6 is an example serial data stream after passing through a communication gateway in accordance with the present disclosure;

Similar reference numerals may have been used in different figures to denote similar components.

DETAILED DESCRIPTION

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine readable medium. Elements referred to in the singular may be implemented in the plural and vice versa, except where indicated otherwise either explicitly or inherently by context.

Other examples and corresponding advantages may be readily discernible in view of the present disclosure.

Figure 1:
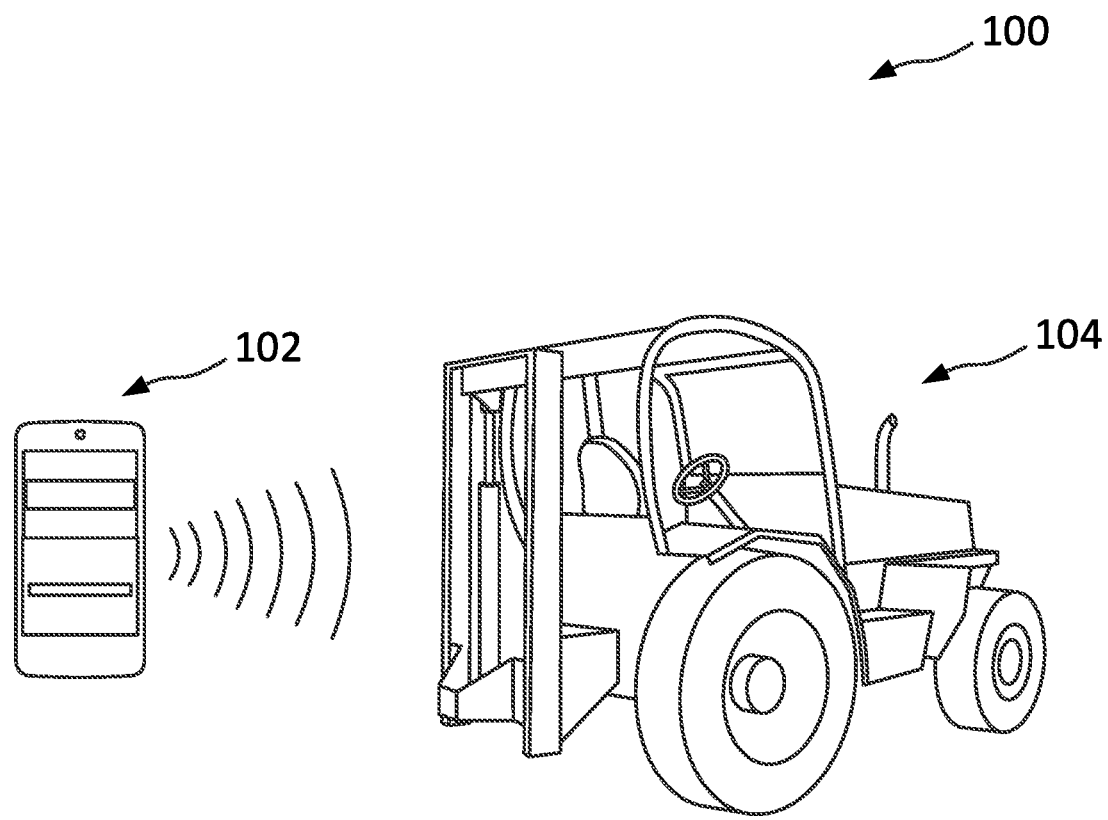
FIG. 1 is a schematic view of an mobile CAN-Bus control system in accordance with one example embodiment of the present disclosure.

Reference is made first to FIG. 1, which shows a mobile CAN-Bus control system 100 in accordance with an example embodiment of the present disclosure. The mobile CAN-Bus control system 100 includes a mobile controller 102, such as a mobile smart phone or a portable computing device, in bi-directional wireless communication with a communication gateway (shown in FIG. 8) operably coupled to a machinery 104.

As known, the CAN-Bus protocol allows various electronic control units (ECUs) inside a machinery such as an automobile to communicate with each other without complex dedicated wiring in between. CAN-Bus messages are typically transmitted serially on a two-wire communication medium into a communication gateway, such as a Bluetooth™ gateway (shown in FIG. 8).

A communication gateway may be operably coupled to the CAN-Bus control system of the machinery 104. The communication gateway may run on the same floating voltages that the CAN-Bus communication uses. The CAN-Bus control system signals are converted into a data stream based on the communication schema in accordance with the present disclosure. The gateway may be configured to transmit the converted data stream to the mobile controller 102 for on-board processing. The converted data stream may comprise of operating parameter values that are indicative of one or more operational states of the one or more aspects of the machinery 104. The converted data stream may be transmitted using any suitable wireless protocol such as Bluetooth™ and/or Wi-Fi to the mobile controller 102.

In some embodiments, the communication throughput between the gateway and the mobile controller 102 may be defined by the communication protocol. By way of a non-limiting example, for Bluetooth Classic™ and/or BLE™ (Bluetooth Low Energy), the target total throughput may be 250000 kbps at 2.4 GHz to handle standard CAN Open 2.0B communication signals.

In some embodiments, in order to avoid extended latency, the CAN-Bus communication signals may be limited to lower levels which may increase the performance of the communication between the mobile controller 102 and the gateway. When available, the communication between the mobile controller 102 and the gateway may be isolated on a second CAN-Bus network.

Figure 2:
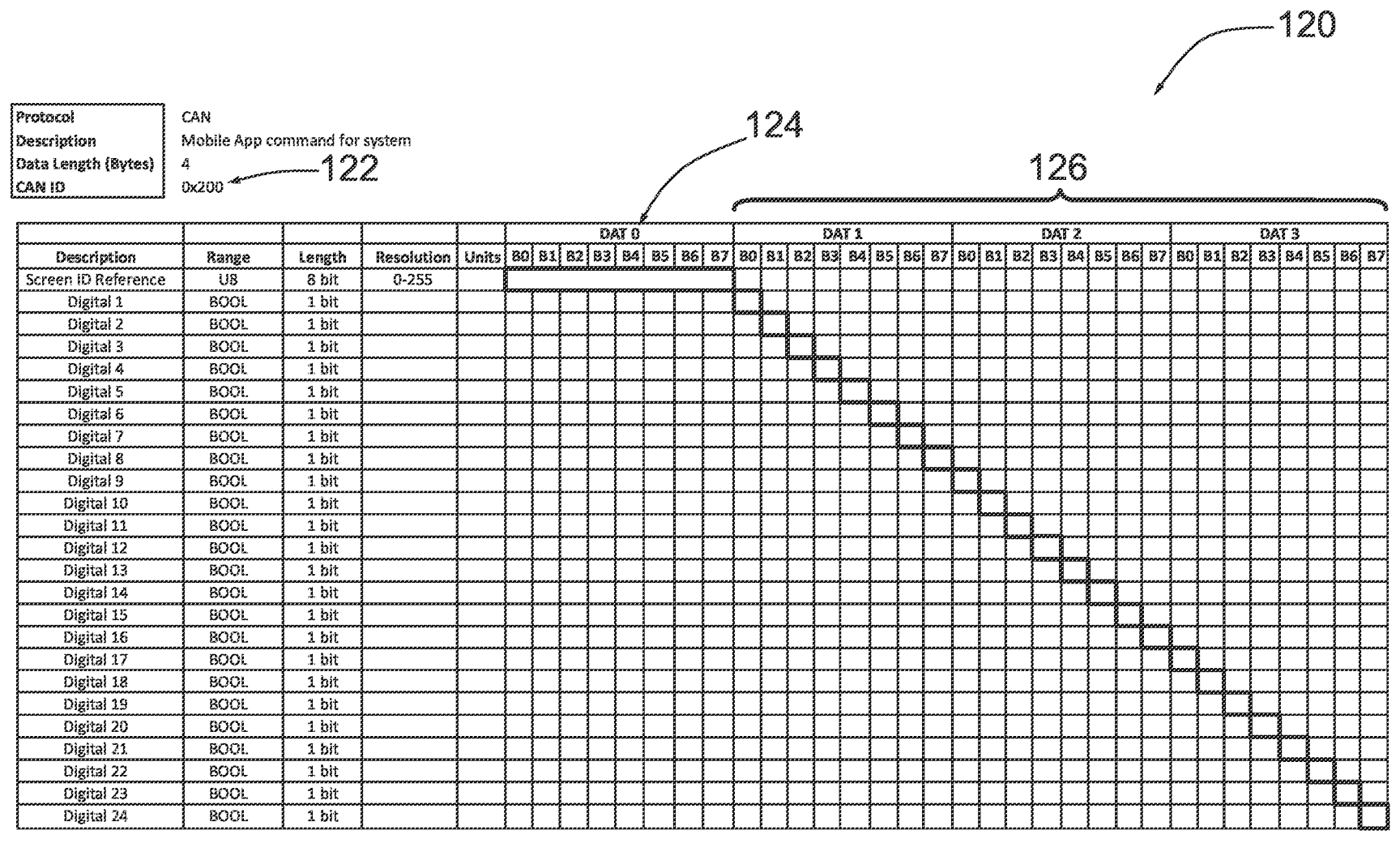

The control system 100 may command certain actions of elements of machinery 104 such as ECUs or actuators. Examples commands may include initiate calibration, reset calibration, turn on lights, etc. One or more such commands typically with a binary command value (ie. on/off, start/end) may be issued by way of a digital command message in accordance with the communication schema disclosed herein. The digital command messages may be bi-directional between the machinery 104 and the mobile controller 102. FIG. 2 shows an exemplary digital command message 120 of the communication schema in accordance with one aspect of the present disclosure for defining digital command messages. In some embodiments, the digital command messages may be designed for flexibility as opposed to bit packing.

Specifically, FIG. 2 shows an exemplary digital command message 120 composed in accordance with the communication schema disclosed herein. Message 120 includes an identifier (ID) field 122. As shown in the illustrated embodiment, a hexadecimal ID value of 0x200 (512 in decimal value) may be defined as the message transmitted from the of mobile controller 102 to the machinery 104. Correspondingly, a hexadecimal ID value of 0x250 (592 in decimal value) may be indicative of a message transmitted from the machinery 104 to the mobile controller 102. Messages 120 may be formatted the same in either direction of transmission. The illustrated ID values are not intended to be limiting and may be configured to be any other suitable value.

The illustrated digital command message 120 is a 4-byte data. The first bye data identified as "DAT0" is an unsigned 8-bit page index lookup identifier 124, which may indicate an index lookup value ranging from 0-255 with each page index lookup value defining a command or a group of commands predefined on each machinery 104. By way of a non-limiting example, a page index lookup value of "00000001" may be indicative of the group of commands for calibration. It is to be appreciated that the format of the page index lookup identifier 124 may be of other form such as signed value, and the size of the identifier 124 may be any other suitable length as permitted by memory space addressing.

The message 120 further includes index specifier fields 126 that may specify individual commands within the group of commands indicated by the page index lookup identifier 124. In the illustrated embodiment, the index specifier fields 126 include the remaining three bytes "DAT1", "DAT2", and "DAT3", which in total comprise of 24 bits each in the form of a true/false Boolean flag with each bit representing a distinct command. By way of a non-limiting example, bit "B0" in "DAT1" may be indicative of the command "begin calibration" within the calibration command group.

In the same example as used above, to begin calibration, a message 120 with message ID 0x200 having a hexadecimal value "0x01 0x80 0x00 0x00" may be sent from the mobile controller 102 to the machinery 104. The "0x01" part of the message 120 is indicative of calibration group of commands. The "0x80 0x00 0x00" portion of the message 120 is "10000000 00000000 00000000" in binary showing the binary value at B0 of DAT1, which is indicative of the command "begin calibration", being true (binary value of "1") while the rest of the specifier fields are set to false (binary value of "0").

An index lookup table is locally stored on a computer-readable memory storage in both the mobile controller 102 and the machinery 104, and used to identify the storage memory locations of pre-defined operating parameters. Specifically, the memory storage location or the memory array of predefined operating parameters of machinery 104 are stored within an index lookup table as variables during an initialization step. Then, whenever a digital command message 120 is received, the page index lookup identifier 124 and index specifier fields 126 are extracted therefrom, and used to identify the corresponding memory location. The command value, which in case of digital command is the binary value of one or more of the index specifier fields 126, is then dumped into the identified memory location or memory array. The index lookup table is locally stored onboard the mobile controller 102, and the machinery 104.

In the embodiment shown in FIG. 2, with 24 lookup specifier fields 126 and an 8-bit page index lookup identifier 124, a total of 6144 possible commands may be represented. Again, other data formats and varying data field size may impact the number of possible commands.

In some embodiments, CAN-Bus communication, such as CAN Open 2.0B may be converted into a data stream, such as a Serial Port Protocol data stream. Each digital command message 120 may be translated bi-directionally between a CAN frame and a byte stream. In some embodiments, to further enhance reliability with wireless transmission, each wireless transmission may be followed with a cyclic redundancy check (CRC)-32 value along with a checksum to verify transmission integrity. It is to be appreciated that CRC-32 check or any other suitable forms of error checking data structure may be used.

In some embodiments, a heartbeat signal may be used to ensure transmission integrity. With each sent transmission signal, a received acknowledgement signal may be sent back to ensure the transmission operation was completed successfully. In the absence of an acknowledgement signal, the previous transmission signal may be resent. In some further embodiments, the heartbeat signal may be used to define the appropriate communication schema.

Within the communication schema in accordance with the present disclosure, the transmission of real-time data may be performed using analog command messages. Analog command messages may also be utilized to, among others, ensure that proportional voltage will fire upon request and to handle failsafe shutdowns when communications drop out. The analog command messages may be initiated using CAN-bus to send a data stream formatted in accordance with the communication schema disclosed herein to perform a predefined action on all devices listening for commands in machinery 104. The format of the analog command messages may be fluid and subject to change based on the specific data being transmitted as disclosed in more detail below. Further, analog command messages in accordance with the communication schema disclosed herein may be bi-directional and can comprise of multiple messages as disclosed in more detail below.

Figure 3:
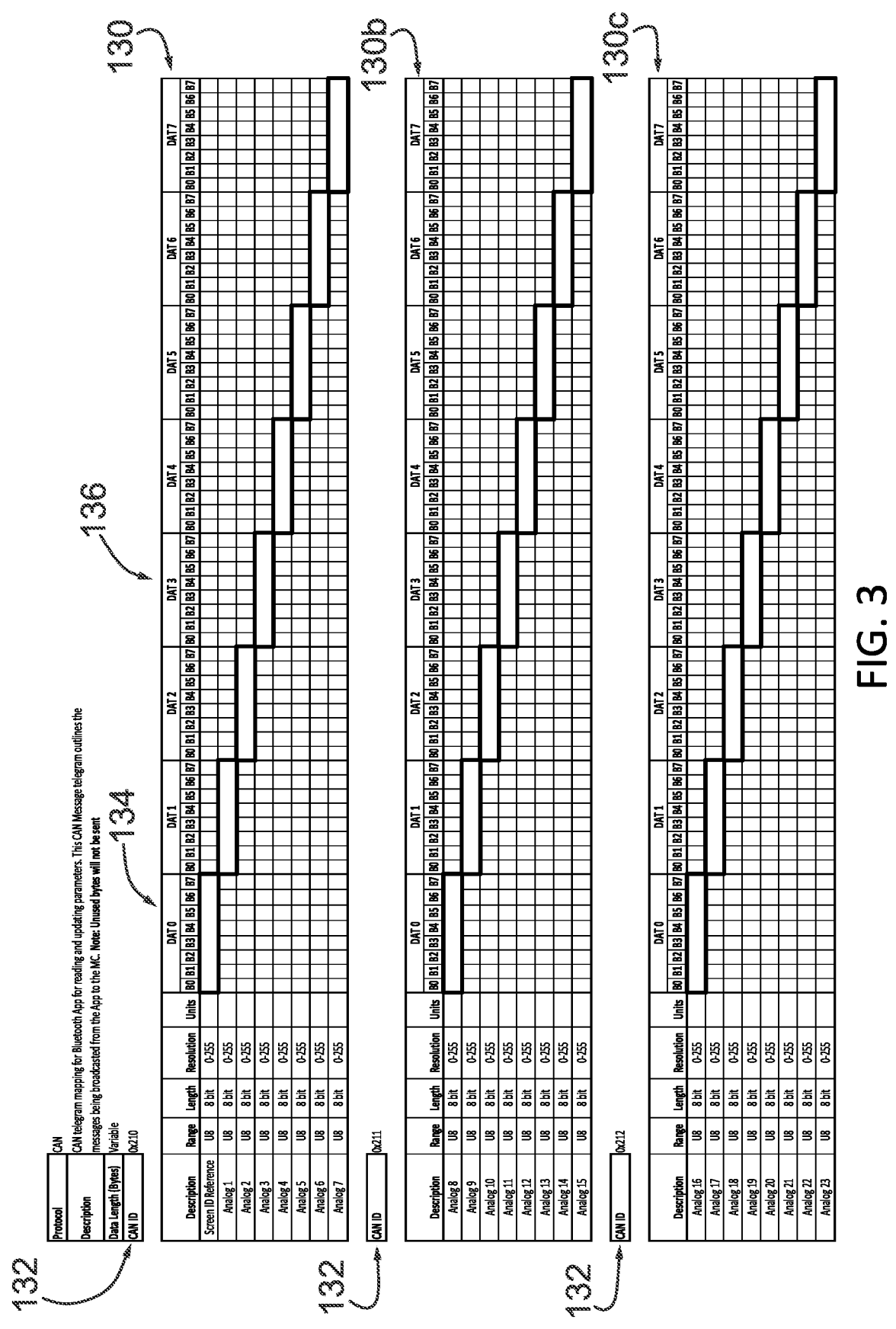

FIG. 3 shows exemplary CAN-bus analog command messages 130a, 103b, and 130c (collectively referred to as analog command messages 130) in accordance with the communication schema disclosed herein. Each message includes a message identifier 132. As shown, the value of identifier 132 of the messages 130a, 130b, and 130c are 0x210, 0x211, and 0x212 in hexadecimal value, respectively (528, 529, and 530 in decimal value, respectively), which may be defined as analog command messages transmitted from the mobile controller 102 to the machinery 104. Analog command messages transmitted from the machinery 104 to the mobile controller 102 may be defined with message identifiers 0x260, 0x261, and 0x262 in hexadecimal value, respectively, (608, 609, and 610 in decimal value, respectively) for example.

Each analog command message 130 is an 8-byte value. As shown, the unsigned 8-bit "DAT0" byte is defined as an index lookup identifier 134, which may be used to identify the layout or format of the data that is to follow. Bytes "DAT1" through "DAT7" may contain an application specific message 136.

Analog signals or values may be transmitted as an unsigned 8, 16, or 32-bit number. In embodiments where an analog command message 130 is using multiple 8-bit messages to be appended into one larger analog signal, then the larger message may have the potential of being spread out across any of the analog command messages, such as 0x210, 0x211, and 0x212.

In some embodiments, multiple analog command messages 130 may be combined in order to increase their range of value. Assuming, unsigned value, a single 8-bit byte may represent integer values ranging from 0 to 255. When two bytes are combined, the range of value extends to 0 to 65535. With four bytes, the data range becomes 0 to 4294967295. Such data range may be used to for commands involving amounts dispensed, speeds, distance traveled, and continuous transmission of a weight sensors data etc.

A corresponding index lookup table is locally stored on a computer-readable memory storage, and used to identify pre-defined operating parameters that may be specified by the analog command messages 130. Specifically, whenever one or more analog command messages 130 are received, the index lookup identifier 134 are used to identify the layout of the data attached therein. The application specific message 136 may then stored in memory based on the specified message layout. The index lookup table for analog command message is locally stored onboard the mobile controller 102, and the machinery 104.

Within the communication schema in accordance with the present disclosure, permanently stored data such as user preferences, calibration data, system information, etc. may be transferred using parameter read/write messages. The parameter read/write messages are bi-directional communication messages are capable of fetching and storing information.

FIG. 4 illustrates example parameter read/write messages 140a and 140b (collectively referred to as parameter read/write messages 140) in accordance with the communication schema disclosed herein. Message 140a includes an identifier 142 with a hexadecimal value of 0x300 (768 in decimal value) may be indicative of messages transmitted from the mobile controller 102 to the machinery 104. Message 140b with an identifier 142 having a hexadecimal value of 0x350 (848 in decimal value) may be indicative of messages transmitted from the machinery 104 to the mobile controller 102. It is to be appreciated that the illustrated identifier 142 values are not intended to be limiting and other suitable values may be used.

Within the message 140, byte "DAT0" is used to identify the type of message being sent. As shown, bits "B0" and "B1" of "DAT0" may be used to indicate Read/Write, where "01" defines a Read Request, "10" defines a Write Request. Bits B2 and B3 may be used to indicate parameter update where "01" may indicate a single parameter update, and "10" may indicate all parameter update. Bits B4 and B5 may be used to indicate the sign, where "00" may indicate a positive value, and "01" may indicate a negative value. Bits B6 and B7 of DAT0 may be used to indicate value type, where, for example, "00" may indicate a Boolean value, "01" may indicate a unsigned-8-bit (U8) value, "10" may indicate an unsigned 16-bit (U16) value, and "11" may indicate an unsigned-32-bit (U32) value.

Bytes "DAT1" and "DAT2" of messages 140 form a U16 value defining a parameter lookup index 144 ranging from 0 to 65535 for indicating the parameter to access. If the parameter is a write request, a further new value is appended. The new value can either be 1,2, or 4 bytes depending on the parameters type. Bytes "DAT3" through "DAT6" as shown contain the new value to be written to the indexed parameter. When performing a read request, the receiving device may respond with a write request for the parameter in question with the read request's parameter lookup index 144.

The CAN-Bus message formed in accordance with the communication schema disclosed herein may then be converted to a data stream and sent to a gateway. FIG. 5 shows an example embodiment of a data stream 150 of the serial communication prior to entering the gateway. The exemplary data stream 150 is not be filtered or masked, as such steps may be performed onboard the Bluetooth gateway to reduce the amount of wireless data transmitted as discussed in further detail below. This may maximize efficiency of the wireless broadcast, which, in turn, may increase reliability, and range of the signal.

As mentioned above, filtering and masking may be performed onboard the gateway. In some embodiments, the CAN-Bus messages may be masked through the Identifier Range: 0x90000010→0xFF0000FF as well as the Single Identifier values of: 0x30B, 0x30D, 0x350, 0x700, 0x701. FIG. 6 shows an exemplary data stream 160 of the serial communication once it has passed through the gateway. The data stream 160 may then be transmitted to the mobile controller 102 for parsing and further processing, such as cloud storage as discussed in more detail below.

The data stream outputted by the gateway is then transmitted to the mobile communication units 102 via a suitable communication protocol such as Bluetooth™ or Wi-Fi. Upon receipt of the transmitted data stream, the mobile communication unit 102, and more particularly a mobile application contained therein, parses the received data stream. The parsed data is then translated, based on a communication schema in accordance with the present disclosure, from the CAN format to useable data points for 64 bit processing and data handling.

Upon receipt of a signal containing modified system parameter values from the mobile communication device 102, the gateway translates the received signal into CAN-Bus compatible communication signals based on communication schemas used to encode the signal.

As it may be readily appreciated, the communication link between the mobile controller 102 and the machinery 104 may have several possible points of failure due to, at least in the part, the wireless nature of the communication. Thus, in some embodiments, it may be desirable for the control system 100 to be able to determine whether communication is occurring, and/or all operations have completed successfully.

In some embodiments, in order to determine that the control system 100 is communicating, both the mobile controller 102 and the machinery 104 transmit a message continuously. The mobile controller 102 may transmit a message with the CAN identifier 0x30C (730 decimal) when it receives a message from the system with a CAN identifier of 0x30D (781 decimal). The system then used the 0x30C response to determine whether a mobile smart device is connected.

In some embodiments, when either Digital Command, Analog Command, or Parameter Write message is sent, the transmitting device may expect to receive a response. In the event that no response is received in a timely manner, the transmitting device may resend the original command message. For example, the response messages may have a hexadecimal identifier value of 0x30A (778 decimal) for transmissions form the mobile controller 102 to the machinery 104. Messages with a hexadecimal identifier value of 0x30B (779 decimal) may be indicative of confirmation messages from machinery 104 to mobile controller 102.

In some embodiments, where the communication link between the mobile communication unit 102 and the gateway is established using Bluetooth™, the communication link may either be half-duplex, or alternatively full-duplex where transmission and reception may occur simultaneously.

Figure 7:
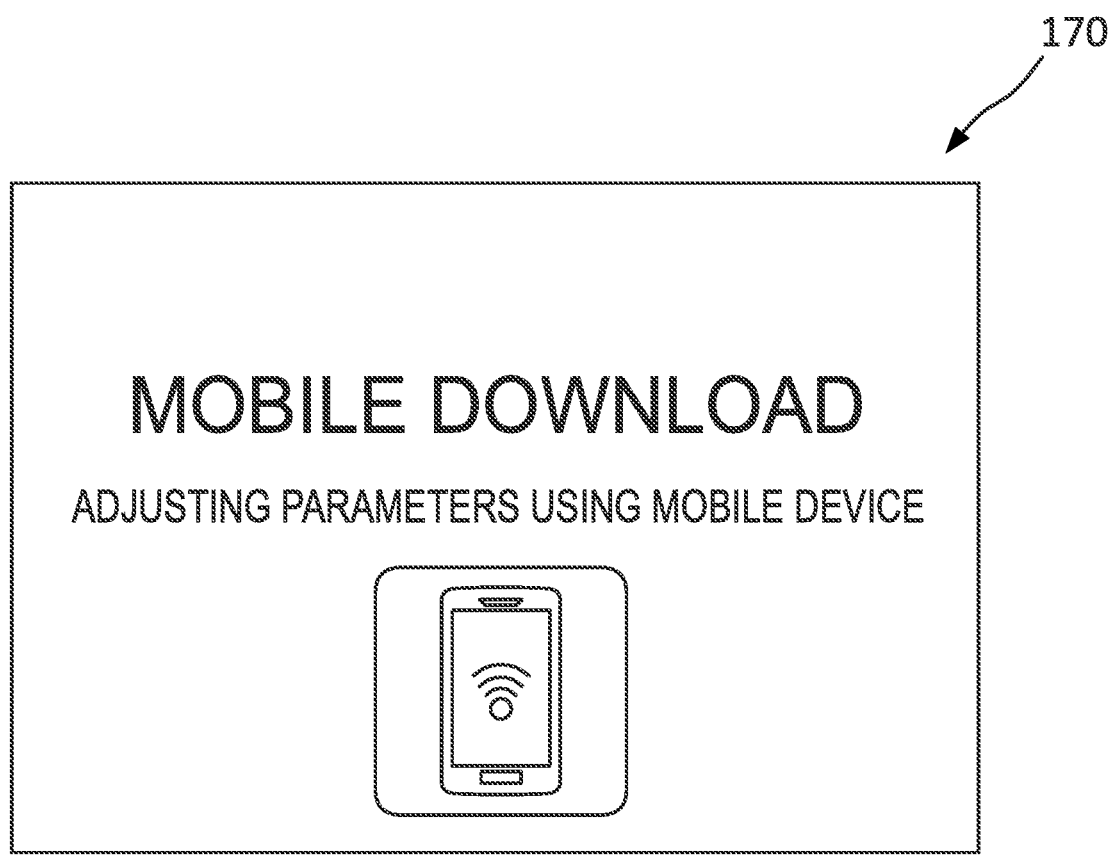
FIG. 7 is a warning message presented on a HMI for alerting the operator of a modified data value by the mobile CAN-Bus control system of FIG. 1.

In some embodiments, the mobile controller 102 may be configured to present an operator of the machinery 104 with notifications of any data modification through a warning message 170 on a Human Machine Interface (HMI) as shown in FIG. 7. This may also help to reduce the risk of parameters being manipulated locally and remotely. It is to be appreciated other types of notification screens may be possible where previous value and adjusted values are shown. Some embodiments may further incorporate a confirmation screen so that inadvertent data changes may be minimized.

Figure 8:
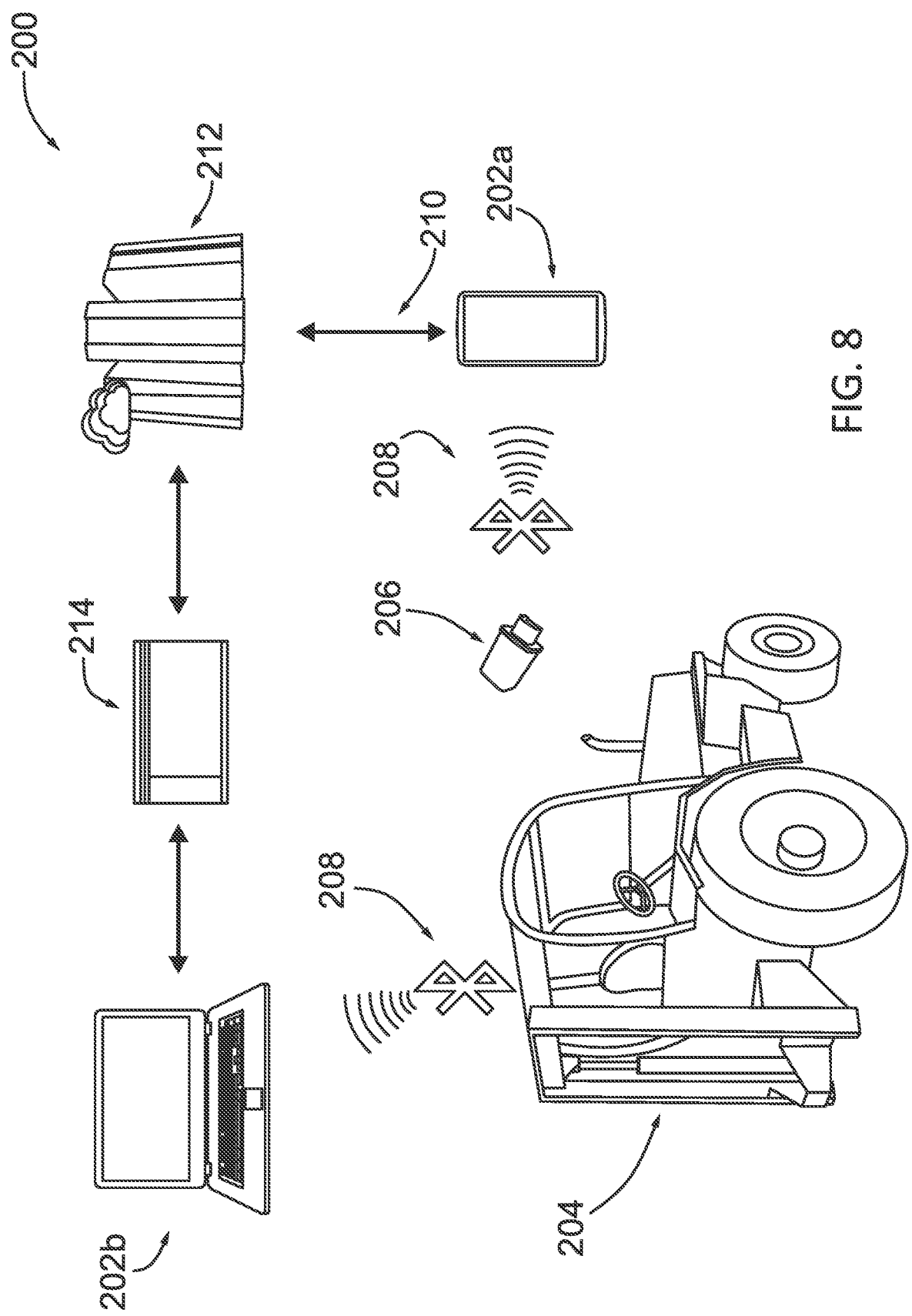
FIG. 8 is a schematic view of a mobile CAN-Bus control system in accordance with another example embodiment of the present disclosure.

FIG. 8 illustrates another example embodiment of a mobile CAN-Bus control system 200 in accordance with the present disclosure. As shown, mobile controllers 202a in the form of a mobile communication unit and mobile controller 202b in the form a portable computing device, collectively referred to as mobile controllers 202, are communicatively coupled to machinery 204 through gateway 206. The gateway 206 may be embedded within machinery 204 or attached external thereto. As shown, communication between gateway 206 and mobile controllers 202 is established via Bluetooth™ link 208. However, it is to be appreciated that any other form of wireless communication protocol, such as Wi-Fi may be used.

Additionally, the mobile controller 202a is shown to be bi-directionally connected through the communication link 210 to a data storage device 212. The data storage device 212 may be in the form of a cloud server, a dedicated backend server or any other suitable types of communication and data hosting device. It may be further appreciated that although one instance the data storage device 212 is shown, configurations involving multiple storage devices 212 is possible. The bi-directional communication link between the data storage device 212 and the mobile controllers 202 may be established using any suitable communication protocol. By way of a non-limiting example, data transmission from the mobile controllers 202 to the data storage device 206 may be facilitated using Hypertext Transfer Protocol Secure (HTTPS) using a REST API whereby data transmission may be initiated through an API call. In some embodiments, the data transmission may be further encrypted using the 256-bit Advanced Encryption Standard (AES) or any other suitable encryption specification standards to improve data security.

In the illustrated embodiment, the data stored on storage device 212 may be hosted through one or more web servers hosting solutions such as AWS, Azure™, or Firebase™.

A communication link between the mobile controllers 202 and the data storage device 212 may allow the mobile controllers 202 to retrieve, modify, add, or remove data from the data storage device 212 as needed. The communication link 210 may permit live data to be utilized on the mobile controller 102 or the machinery 104 to enable near real-time system assessment and/or issue operational changes.

In some embodiments, a cloud storage server is used to create a communication point between multiple devices to handle multiple devices and connections. A non-limiting example may include storing or updating a default configuration that can be applied to all connected system.

In some embodiments, a copy of the index lookup table that corresponds with the index lookup identifier within the transmitted data stream may be locally stored on all of the mobile controller 102, machinery 104, and data storage device 212.

As it may be appreciated by those skilled in the art, due to the inherent latency of server communication, the communication signals between the server and the mobile communication units may need to be handled differently than phone and a real-time control system communications. The necessitation of handshakes and signal confirmations are much more complex with significant latency as part of the cloud connections. This complexity is handled in the design schema in development. The communication schema in accordance with the present disclosure advantageously handles latency through synchronization with the heartbeat signal, which may lag for seconds and as soon as communications are established the system continues to operate. The heartbeat signal may also be used from a control perspective for safety. For example, if the mobile communication unit losses connectivity (recognized by the heartbeat timeout), then all outputs are set to zero to provide a fail-safe mechanism.

As mentioned, mobile communication unit 202 in the form of a smartphone typically use 32-bit processors, which limits the amount of addressable memory space. The communication schema in accordance with the present disclosure may be devised in such a way to make memory and scalability virtually limitless by bridging cloud technology (co-located remote servers) and CAN-Bus technology through smartphones.

In some embodiments, the system parameters transmitted from the gateway to the mobile communication units may be directly uploaded to the cloud server without parsing and/or protocol translation. Thus, the data stored in the cloud server may be in CAN compatible format. When the stored data is retrieved by the mobile communication unit, parsing and protocol translation may be performed by the mobile communication unit.

Figure 9A:
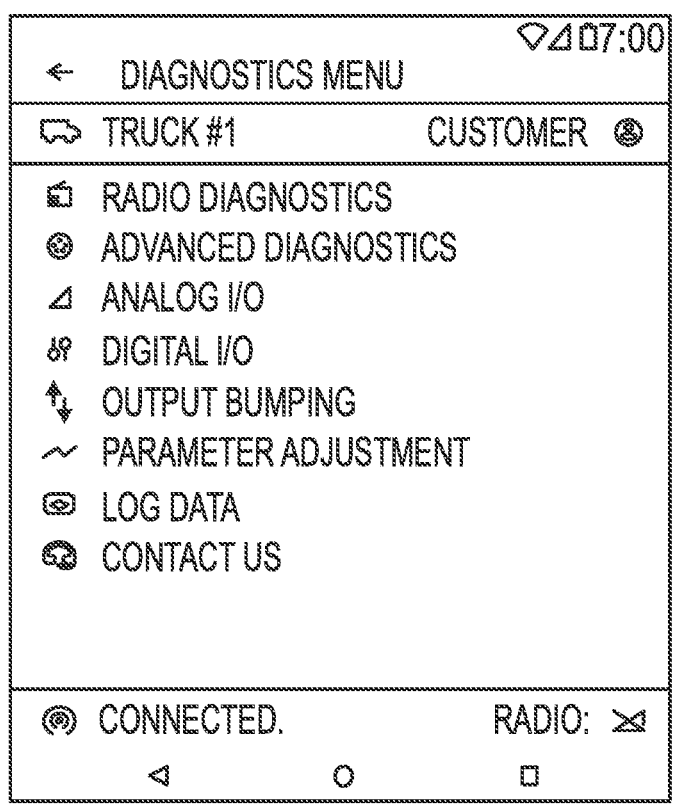
FIG. 9A is a screenshot of a "Diagnostic Menu" screen of the mobile application of the mobile CAN-Bus control system in FIG. 1 or 8.
Figure 9B:
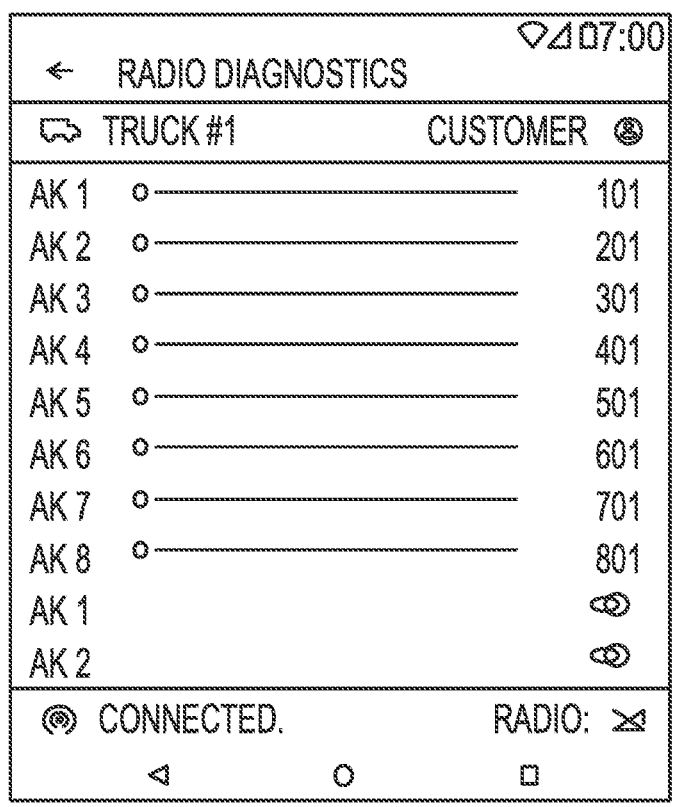
FIG. 9B is a screenshot of a "Radio Diagnostics" screen of the mobile application of the mobile CAN-Bus control system in FIG. 1 or 8.

In some embodiments, the mobile application on the mobile communication device may be compatible with current smartphone operation systems such as iOS™ and Android™. The mobile application may have access to a full range of system diagnostic data that can include I/O information relative to the connected machinery. In some embodiments, Advanced Diagnostics for Radio controlled signals can also be included. The operator may be able to view this information to help diagnose any issues relating to the machinery. FIGS. 9A and 9B show exemplary "Diagnostic Menu" screen 402 and an example "Radio Diagnostics" screen 404, respectively.

Figure 10:
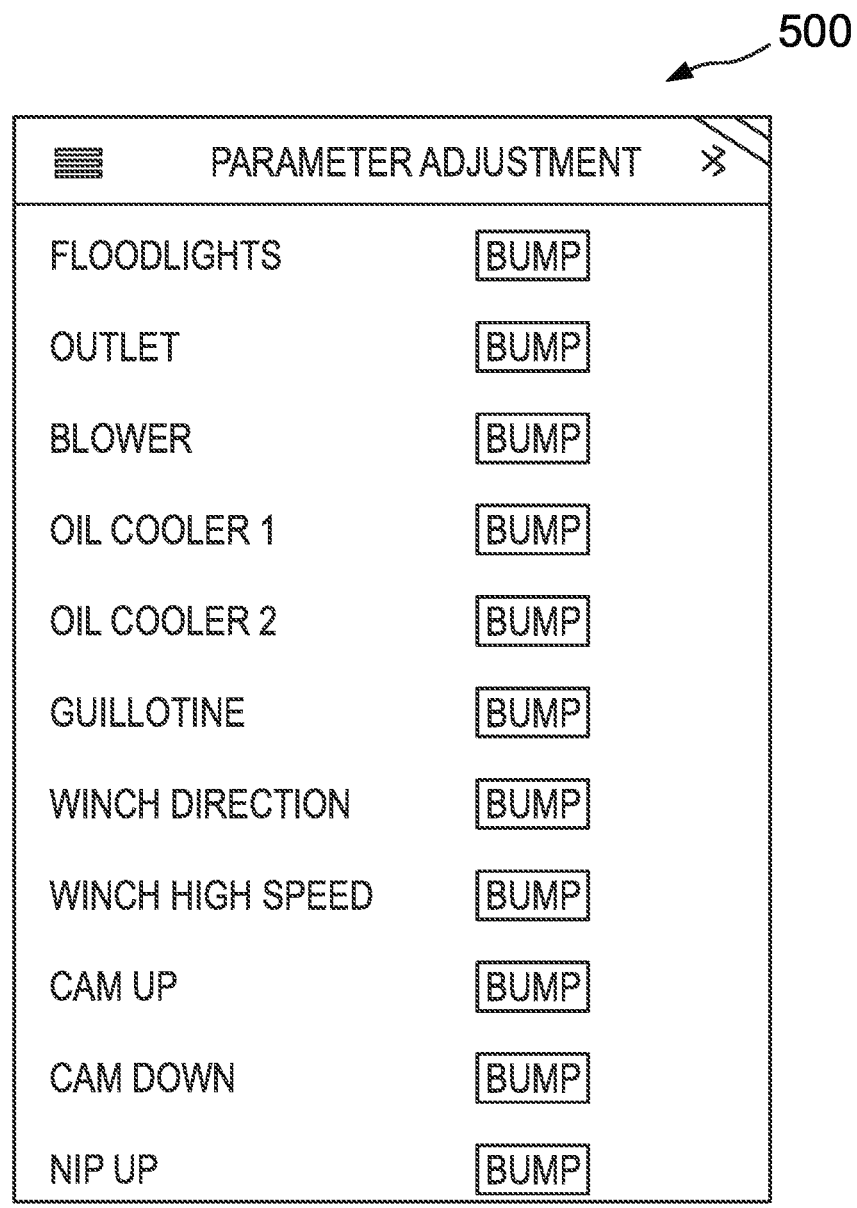
FIG. 10 is a screenshot of a output bumping screen of the mobile application of the mobile CAN-Bus control system in FIG. 1 or 8.

Additionally, in some embodiments, the mobile application may allow for output bumping in order to test certain functions on the machinery. An example embodiment of an output bumping screen 500 is shown in FIG. 10. It has been appreciated that output bumping may allow for operations to be triggered without the regular program interlocks. Output bumping may be useful for testing damaged sensors/coils or wiring faults.

In some embodiments, output bumping may only be made available on select operations/functions and may only be activated by experienced operators familiar with the machinery and its capabilities.

In some embodiments, along with system diagnostics, the mobile application may be capable of logging I/O information. Signals from the mobile application can be logged in order to record data relating to system performance and faults. The recorded logs can be saved and used for further analysis.

In some embodiments, machine system parameters may be accessible from Plus+1 service tool, or any other suitable hardware flushing application, can also be configured and made available to the mobile application. This can include pressure settings, display units overrides among others. The list of parameter settings may be customizable.

Figure 11:
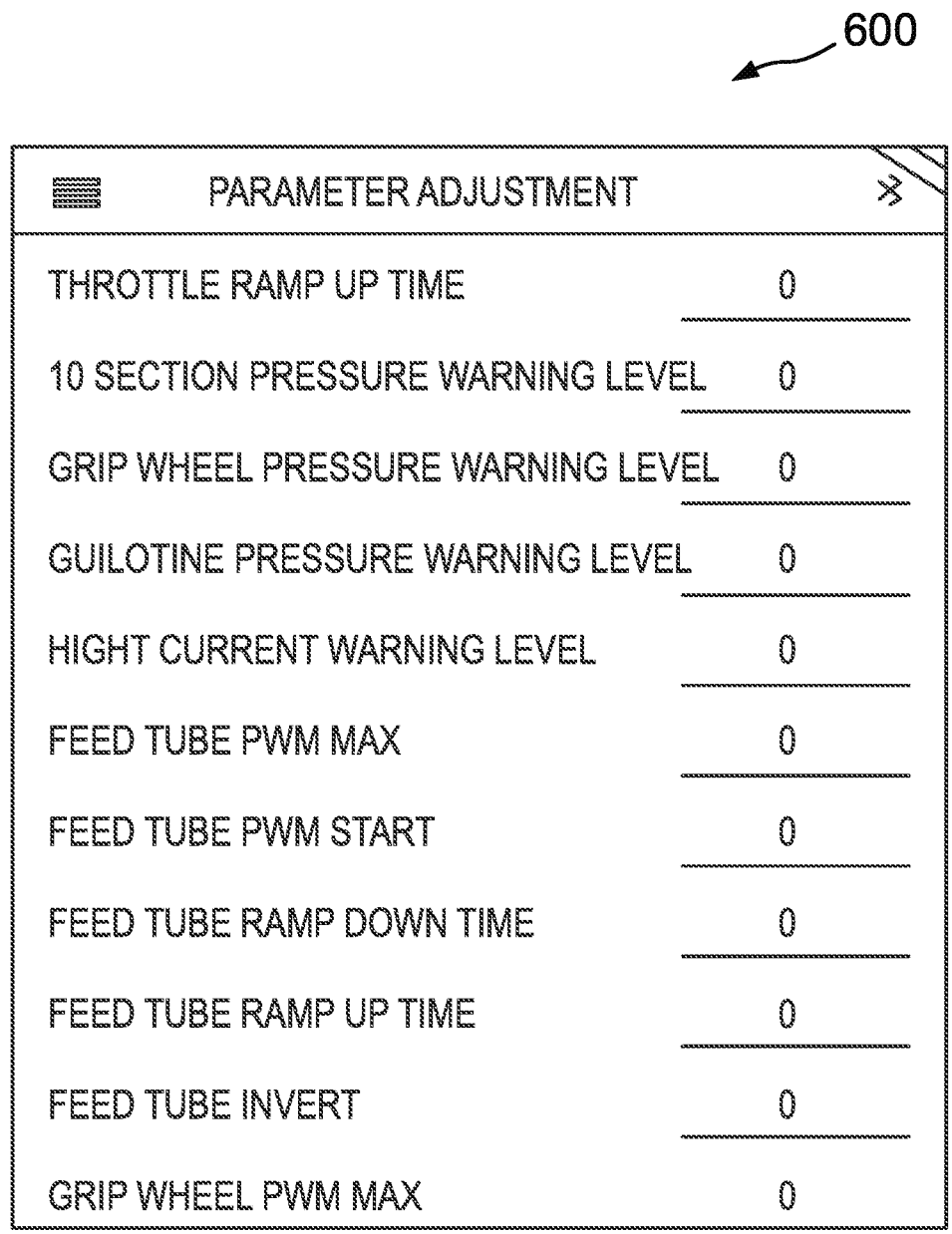
FIG. 11 is a screenshot of a "Parameter Adjustment" screen of the mobile application of the mobile CAN-Bus control system in FIG. 1 or 8.

In some embodiments, CAN-Bus based system parameter adjustments may made using a parameter write protocol and parameter index table in accordance with the present disclosure. FIG. 11 shows an example embodiment of a "Parameter Adjustment" screen 600 of the mobile application.

In some embodiments, system calibrations can be performed by the mobile application using a series of established commands and parameters. This may include sensor calibration for adjustable heights or limits and may also include more complicated automated calibrations such as a series of system and sensor checks. Calibration "wizards" may be included in some embodiments to provide step-through checks and sensor calibration to help simplifying normally complex calibration routines.

In some embodiments, the machinery containing the CAN-Bus based system may be a heavy-duty material handler, such as a forklift. The mobile control system in accordance with the present disclosure for such a machinery may obtain CAN-Bus system parameter data from, or modify parameter values for, components comprising operator controls, electronic-driven hydraulics, as well as closed loop sensors for safer and more efficient operation. By way of non-limiting examples, the control elements that may be coupled with the mobile CAN-Bus control system for a heavy duty material handler may comprise drive, steer, forks in/out, forks up/down, transmission, brakes, sensors for fork positions, sensors on drive shafts for transmission control, electronic engine control and feedback, and electronic operator controls (steer by wire). Additionally, automation elements of the heavy duty material handler, such as elements for collision avoidance and horsepower limiting, may also be configured to work with the mobile control system disclosed herein.

In some embodiments, the machinery containing the CAN-Bus based system may be a vacuum truck. The mobile control system in accordance with the present disclosure for such a machinery may obtain CAN system parameter data from, or modify parameter values for, components comprising a radio remote control, hydraulic control interface and a fan/vacuum control system to operate a boom, suction and engine controls. By way of non-limiting examples, the control elements for a vacuum truck may comprise boom up/down, boom left/right, vacuum controls, drive, sensors for boom position, communications for radio remote controls, electronic engine control and feedback, and vacuum pressure control. Additionally, automation elements of the vacuum truck, such as elements for automated vacuum control, horsepower limiting, and automated boom control for anti-collision, may also be configured to work with the mobile control system disclosed herein.

In some embodiments, the machinery containing the CAN-Bus based system may be a mobile knuckle-boom crane. The mobile control system in accordance with the present disclosure for such a machinery may obtain CAN system parameter data from, or modify parameter values for, components comprising a radio remote and a local station. The control system may also have anti two blocks for cable protection and anti-stall control for heavy loads as well as overload protections. By way of non-limiting examples, the control elements for a mobile knuckle-boom crane may comprise control of swing, boom lift, second boom lift, boom extend and hoist controls, sensors on arm for position feedback, pressure transducers for load control and limiting, creep drive with closed-loop hydrostatic hydraulic systems. Additionally, automation elements of the mobile knuckle-boom crane, such as elements for collision avoidance for arm control, horsepower limiting during lifts, anti-collision in drive systems, and speed and cable position control of winch, may also be configured to work with the mobile control system disclosed herein.

In some embodiments, the machinery containing the CAN-Bus based system may be a cement mixing truck. The mobile control system in accordance with the present disclosure for such a machinery may obtain CAN-Bus system parameter data from, or modify parameter values for, factors comprising drum rotation speed, drum tilting angle, water injection rate, dry mixing timer, wet mixing timer, discharge speed. The acquired system parameter data may be processed by the mobile communication unit and provide indication as to one or more operational states of the cement mixing truck. An operator may use the mobile application on the mobile communication unit to modify one or more parameter values, which may then be bumped to the CAN-Bus based system on board the cement mixing truck so as to affect the operation of the truck in a desired manner.

Certain adaptations and modifications of the described embodiments can be made. Therefore, the above discussed embodiments are considered to be illustrative and not restrictive.

What is claimed is:

1. A mobile control system, comprising:
   a mobile controller;
   a machinery with a Controller Area Network (CAN) control system, capable of converting CAN-Bus control signals containing an operating parameter value into a data stream based on a communication schema; and
   a gateway operably coupled to the CAN control system, wherein the gateway is configured to transmit the data stream to the mobile controller;
   wherein the data stream includes an index lookup identifier, the index lookup identifier permitting the mobile controller and the machinery to identify the operating parameter value that is indicative of one or more operational states of the machinery, based on a locally stored index lookup table.

2. The mobile control system of claim 1, wherein the mobile controller parses and translates the received data stream into useable data points using the communication schema.

3. The mobile control system of claim 1, wherein the mobile controller is coupled to a server, and the received data stream is uploaded to the server.

4. The mobile control system of claim 3, wherein communication between the server and the mobile controller is encrypted with 256-bit Advanced Encryption Standard.

5. The mobile control system of claim 4, wherein the communication between the server and the mobile controller employs HTTPS data transfer protocol.

6. The mobile control system of claim 3, wherein the communication between the server and the mobile controller is facilitated by REST API.

7. The mobile control system of claim 1, wherein the data stream comprises a 32-bit CRC data transfer check.

8. The mobile control system of claim 1, wherein the data stream comprises a heartbeat signal for defining the communication schema.

9. The mobile control system of claim 8, wherein the heartbeat signal is used to ensure integrity of the transmission.

10. A method of controlling a CAN-Bus based system, the method comprising:
- mapping a CAN-Bus based control system operating parameter value from a machinery into a data stream based a communication schema, wherein the CAN-Bus based control system operating parameter value is indicative of one or more operational states of the machinery, and wherein the data stream includes an index lookup identifier;
- transmitting the data stream to a mobile controller through a communication gateway;
- parsing the received data stream; and
- extracting the operating parameter value using the index lookup identifier based on a locally stored index lookup table.

11. The method of claim 10, further comprising uploading the data stream to a server.

12. The method of claim 10, further comprising
- modifying one or more values of the one or more system parameter values with the mobile controller;
- bumping the modified system parameter values to the gateway; and
- changing one or more operational states of the machinery based on the modified system parameter values.

* * * * *